United States Patent

Shau

[11] Patent Number: 5,841,316
[45] Date of Patent: Nov. 24, 1998

[54] ANALOG SIGNAL PROCESSING CIRCUIT FOR GENERATING AUTOMATIC-GAIN CONTROLLED REFERENCE-SIGNAL-BIASED OUTPUT SIGNALS

[76] Inventor: Jeng-Jye Shau, 991 Amarillo Ave., Palo Alto, Calif. 94303

[21] Appl. No.: 653,472

[22] Filed: May 24, 1996

[51] Int. Cl.$^6$ .................................................. G06G 7/12
[52] U.S. Cl. ........................................ 327/560; 327/355
[58] Field of Search .................................... 323/312, 315, 323/316; 327/103, 355, 356, 360, 361, 560–563

[56] References Cited

U.S. PATENT DOCUMENTS

| | | | |
|---|---|---|---|
| 3,602,707 | 8/1971 | Jones | 235/195 |
| 4,001,602 | 1/1977 | Birchenough | 307/229 |
| 4,004,141 | 1/1977 | Curtis | 328/145 |
| 4,388,539 | 6/1983 | Boeke | 327/103 |
| 4,884,141 | 11/1989 | Hyakutake | 358/174 |
| 4,961,046 | 10/1990 | De Jager | 327/103 |
| 5,012,133 | 4/1991 | Hughes | 323/315 |
| 5,028,822 | 7/1991 | Hughes | 323/315 |

*Primary Examiner*—Toan Tran

[57] ABSTRACT

An analog signal processing circuit is disclosed in this invention. The analog signal processes performed by the circuit of this invention involve mathematical operations of summation, subtraction, multiplication, division, automatic control and different types of filtering operations. Furthermore, a plurality of single-stage circuits may be interconnected to carry out combination of analog signal processing functions according to the methods and circuit configuration provided in this invention. The analog signal processing processes are performed by the analog signal processing circuit through the balance of currents by combining the basic circuit elements of current mirrors, voltage control signal amplifiers, and current sources and sinks. The circuits developed for carrying out these analog signal-processing steps can also be implemented for optical location tracking systems. Complex analog analysis and AGC functions can be defined by a systematic procedure using current balance conditions of voltage controlled current sources by combining single stage circuits according to the method and circuit configuration of this invention. This approach improves speed and accuracy of the optical location tracking systems, while reducing their cost dramatically. The present invention provides flexibility to support many types of optical and electronic devices. Applying the analog processing circuits disclosed in this invention, new and improved optical location tracking devices are developed.

11 Claims, 11 Drawing Sheets

ANALOG SIGNAL PROCESSING CIRCUIT FOR GENERATING AUTOMATIC-GAIN CONTROLLED REFERENCE-SIGNAL-BIASED OUTPUT SIGNALS

BACKGROUND OF THE INVENTION

This invention relates to analog signal processing circuits. More specifically, this invention relates to analog circuits supporting optical location tracking devices to execute filtering, multiplication, division, and automatic gain control functions. New optical location tracking devices are also disclosed in this invention.

Recently, optical location tracking devices have been developed to detect three dimensional location of a light source. One example of such devices is described in U.S. Pat. No. 5,393,970. The reliability and manufacturability of the optical devices have been improved rapidly; they are ready for mass production. In the mean time, the development in the supporting analog signal processing circuits for those optical devices is progressing at a much slower rate. Analog signal processing circuits of current art are too expensive, too slow, and too complex to allow practical applications of optical location systems. The location tracking devices determine the location of a light pointer from the ratio of photo currents detected by their sensors. Although these optical devices have been designed to simplify the calculation equations, there are still many practical difficulties in translating the detected photo current into location using electrical circuits. One major problem is that the amplitude of photo current varies by many orders of magnitudes. It is not easy to design an analog circuit that is accurate for such wide ranges of input levels. It is therefore necessary to normalize the input signals by automatic gain control (AGC) circuits before the input signals are processed. Existing AGC circuits often require averaging and feedback mechanisms. Such AGC circuits are too slow, and they are not compatible with optical location tracking devices. Another major problem is the analog divide operations required for signal processing of these optical devices. Existing analog dividers are typically implemented by an analog multiplier having a feedback mechanism. Such analog divider is very slow, and its accuracy is not adequate for our applications. In addition, we also need to avoid the effect of background noise caused by ambient light. Filtering is often necessary. Due to these practical considerations, a typical support system includes pre-amplifiers, AGC circuits, filters, reference current generators, analog dividers, adders, and multipliers. Such systems are often too slow and their accuracy is poor. To make them function correctly requires careful calibrations, that makes them too expensive for practical applications. Supporting circuits have become the stumbling blocks for realistic applications of optical location tracking systems.

The analog signal processing circuits of the present invention was originally developed to solve the above problems for optical location tracking devices. However, those problems are not unique for optical devices; many other applications also encounter similar problems. Analog signal processing of optical location tracking devices are used as examples to illustrates the structures and operation principles of the present invention in the following sections, but the applications of this invention are certainly not limited in a particular area.

SUMMARY OF THE INVENTION

Accordingly, a primary objective of the present invention is to provide cost-efficient and reliable analog signal analysis circuits. Another objective of this invention is to provide analog circuits capable of executing filtering, automatic gain control, analog signal processing, and amplification by simple single-stage circuits. Another objective of this invention is to provide an analog signal processing circuit operating at a wide range of frequency from DC to GHZ. It is also an objective of this invention to provide an analog circuit that is capable of detecting the ratio of input signal within a wide range of input signal levels. A further objective of this invention is to provide automatic gain control circuit and analog divider function without using slow feedback circuits such as operation amplifiers. Another objective of this invention is to provide a planar optical location tracking device ready for mass production.

The present invention uses a single-stage circuit that is capable of performing all the required analog signal processing for analog systems such as optical location tracking systems. Complex analog analysis and AGC functions can be defined by a systematic procedure using current balance conditions of voltage controlled current sources. This approach improves speed and accuracy of the location tracking systems, while reducing their cost dramatically. The present invention provides flexibility to support many types of optical and electronic devices. We also developed new optical location tracking devices that work better with this invention than prior art devices.

Although this invention was originally developed to support optical location tracking devices, it also provides the flexibility to support many other applications. It can be structured in regular layout similar to application specific integrated circuit (ASIC). It also can be programmed electrically in order to provide ultimate flexibility to support a wide variety of applications.

BRIEF DESCRIPTION OF THE DRAWINGS

The present invention will be described in details with reference to the preferred embodiments illustrated in the accompanying drawings in which:

FIG. 3b is the side view of the geometry in FIG. 3a;

FIGS. 4(a,b) provide the side views and top views of a dual wall location tracking device;

FIGS. 6(a–h) illustrate symbols and circuit embodiments of electrical components used by the present invention;

FIG. 8b is a schematic circuit diagram of a realistic circuit embodiment of the circuit in FIG. 8a;

FIG. 9b is a schematic circuit diagram of a realistic circuit embodiment of the circuit in FIG. 9a;

FIG. 10a is a symbolic circuit diagram of an analog signal processing circuit supporting the location tracking device in FIG. 4a;

FIG. 10b is a schematic circuit diagram of a realistic circuit embodiment of the circuit in FIG. 9a;

DESCRIPTION OF THE PREFERRED EMBODIMENT

Before the invention itself is explained, a prior art location tracking device and several improved location tracking devices are first explained to facilitate the understanding of the invention.

Figure 1:
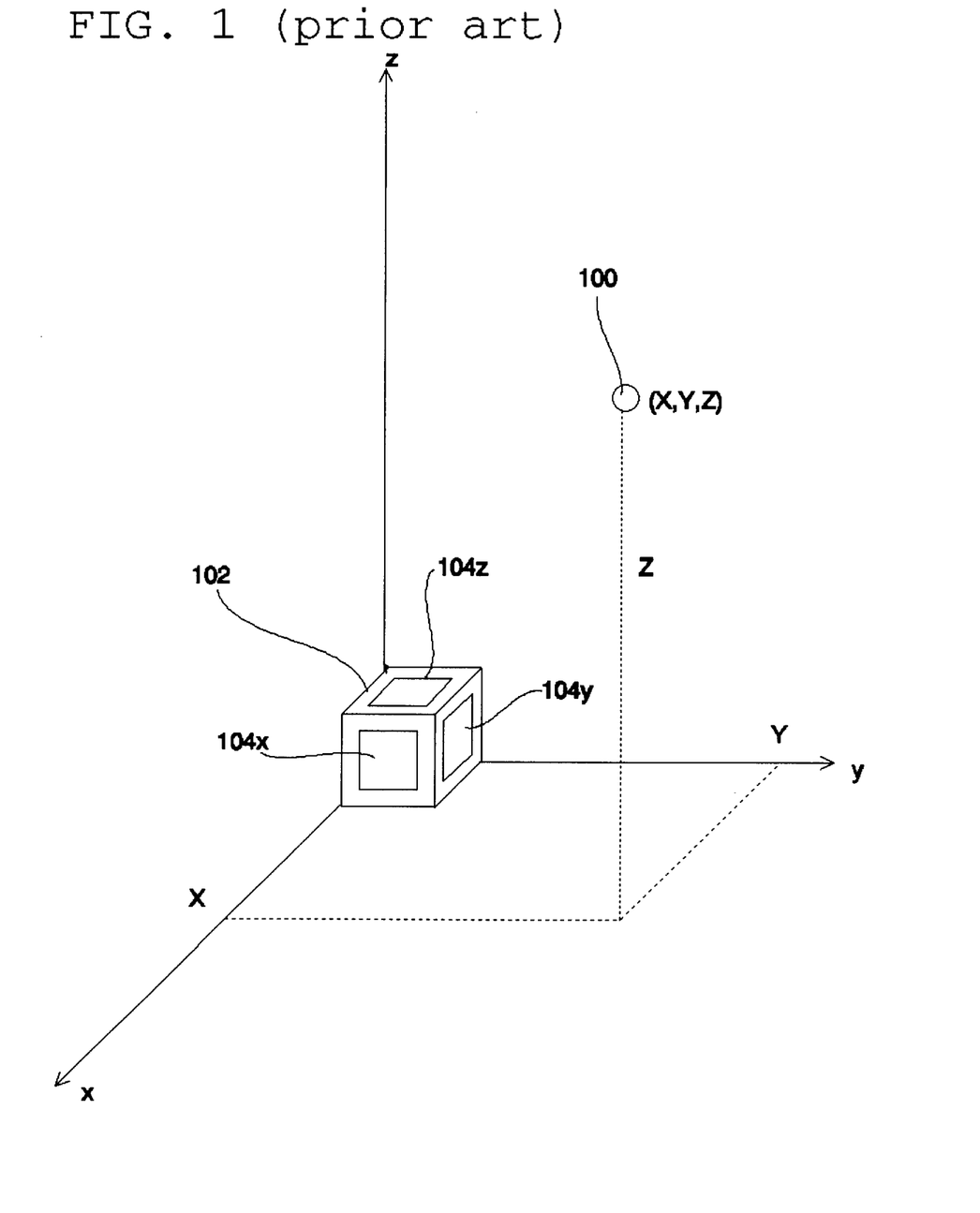
FIG. 1 illustrates the operation principles of a prior art optical location tracking device.

FIG. 1 illustrates the operation principle of a prior art optical location tracking device supported by the present invention. This location tracking device contains a light detector 102 having three planar light sensors 104x, 104y, 104z. The surfaces of those planar light sensors are oriented vertically to one another. A Cartesian coordinate is defined with its x, y, and z axes perpendicular to the surfaces of the planar light sensors. A light source 100 is placed at a location (X,Y,Z) away from the light detector 102 as shown in FIG. 4A. The output signals of the optical sensor are related to the location (X,Y,Z) of the light source as $$I_x:I_y:I_z=X:Y:Z \tag{1}$$

where $I_x$, $I_y$, and $I_z$ represent the photo currents detected by planar light sensors 104x, 104y, and 104z.

Light sensors follow the above behavior has been disclosed in details in U.S. Pat No. 5,393,970.

For a two-dimensional application where the vertical dimension Z is a constant, we can determine the (X.Y) locations by rearranging Eq. (1) as $$X=(I_x/I_z)Z \tag{2}$$

$$Y=(I_y/I_z)Z \tag{3}$$

Figure 2:
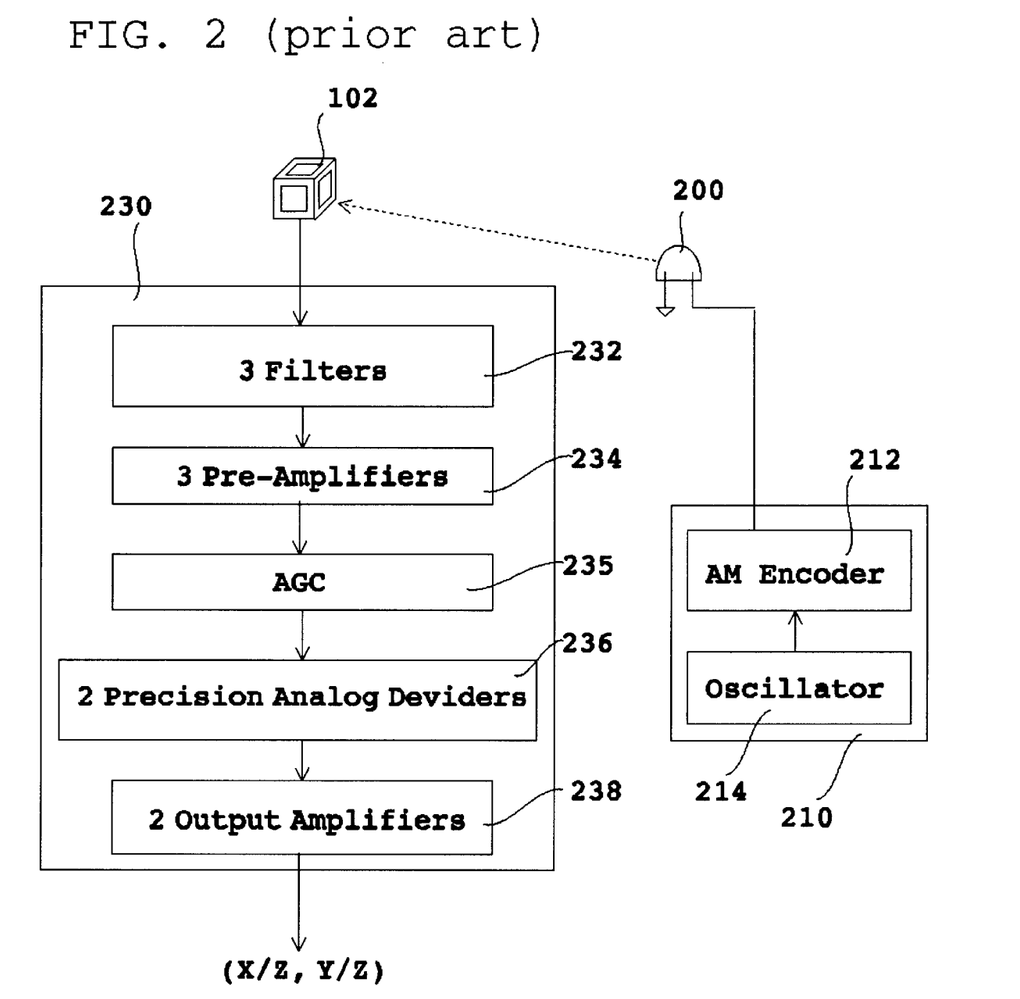
FIG. 2 shows an analog signal processing system of the prior art used to analyze the output signals of the device in FIG. 1.

If the vertical dimension Z is a constant, Eqs. (2–3) indicate that two-dimensional location of a light source can be determined using one light detector 102 by measuring the ratio of sensor currents ($I_x/I_z$) and ($I_y/I_z$). Although Eqs. (2–3) appear very simple mathematically, there are many practical difficulties in measuring the ratio of the optical signals as discussed in previous section. FIG. 2A is an example of a current art electronic system needed to translate photo currents into location. An optical signal generator 210 provides electrical signals to a light-emitting-diode (LED) to generate optical signals. The optical signal generator 210 contains an oscillator 214 that determines the frequency of the light signal, and an amplitude-modulating (AM) encoder that modulates the light signals. The light emitted from the LED 200 is detected by a light detector 102 described in FIG. 1. The output signals of the light detector 102 are analyzed by an analog signal analyzer 230. The optical currents are filtered by band-pass filters 232 to reduce the effect of background noise. The filtered signals are amplified by pre-amplifiers 234. Automatic-gain-control (AGC) circuit 235 normalizes the amplitude of input signals before the ratio of the signals is determined by precision analog dividers 236. The outputs of the precision analog dividers 236, which is proportional to (X/Z, Y/Z), are driven by the output amplifier 238.

The analog signal analyzer 230 described in FIG. 2 comprises 3 bandpass filters, 3 pre-amplifiers, 3 voltage control amplifiers configured as AGC, 2 analog multipliers with feedback circuitry to behave as analog dividers, and 2 output amplifiers; this system has 13 discreet circuit components plus many other supporting circuit elements. It is a complex system that requires detailed calibration and careful layout The system is very expensive. It is also very slow because of the feedback mechanisms needed in the AGC and divider circuits. It is by far too expensive for practical applications of the optical location tracking devices.

Figure 3A:
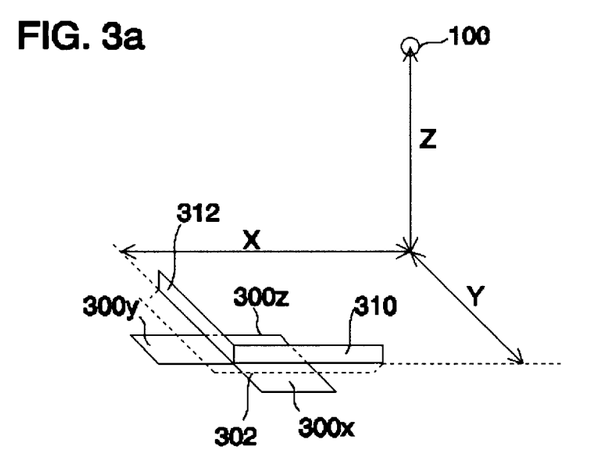
FIG. 3a illustrates the operation principles of a center wall optical location tracking device.
Figure 3B:
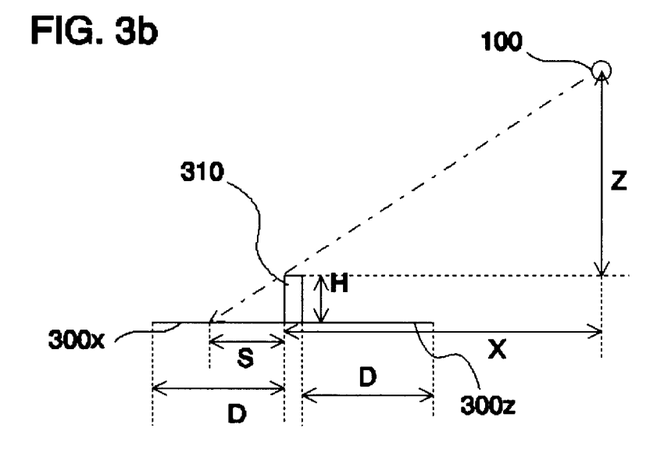

One troublesome manufacture problem for the light sensing device in FIG. 1 is that it requires non-planar light sensing surfaces. Two types of planar sensors were developed to reduce manufacture cost using planar light sensing surfaces. The optical location tracking device illustrated in FIGS. 3a contains 3 planar light sensors 300x, 300y, 300z, and two walls 310, 312. The directions vertical to the walls form a Cartesian coordinate as shown in FIG. 3a. A distance light source 100 is placed at coordinate (X,Y,Z). The light emitted the light source 100 is partially blocked by those walls, and a shadow 302 is cast on sensors opposite to the light source 300x, 300y. When the distance from the light source to those three light sensors is much larger than the size of light sensors, we can assume the light density is uniform. Under this condition, the photo current detected by those light sensors are proportional to the sensor area exposed to the light beams emitted from the light source 100. FIG. 3b is the side view of the geometry in FIG. 3a along X-Z cross section. From the geometry in FIG. 3b, we know that S:H=X:Z where S is the length of the shadow along x direction, and H is the height of the wall 310. We also know that Ix:Iz=(D−S): D, where D is the dimension of the sensor, Ix is the photo current detected by the sensor opposite to the light source 300x, and $I_z$ is the photo current detected by the sensor near the light source 300z. From the geometry shown in FIG. 3b, we have $$X=[(Iz-Ix)/Iz]*(D/H)*Z \tag{4}$$

We also have similar relationship along the y axis as $$Y=[(Iz-Iy)/Iz]*(D/H)*Z \tag{5}$$

where Iy is the photo current detected by the light sensor 300y at the opposite side of the wall 312 vertical to y axis. The above location tracking device is called "center wall" device in the following sections. Eqs. (4,5) provides a simple relationship to determine two-dimensional coordinates from center wall devices. Those equations are true when the light source 100 stay within the first quadrant where both X and Y are positive. When the light source is out of the first quadrant, we need to redefine the equations. To remove such constraint, another location tracking device is developed.

Figure 4A:
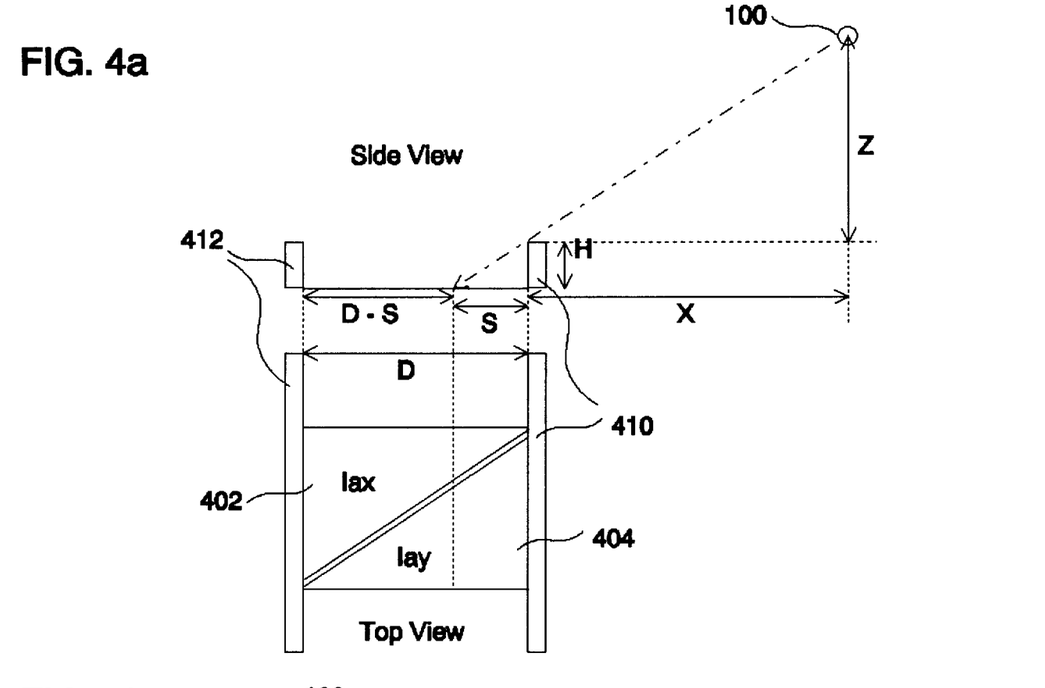
Figure 4B:
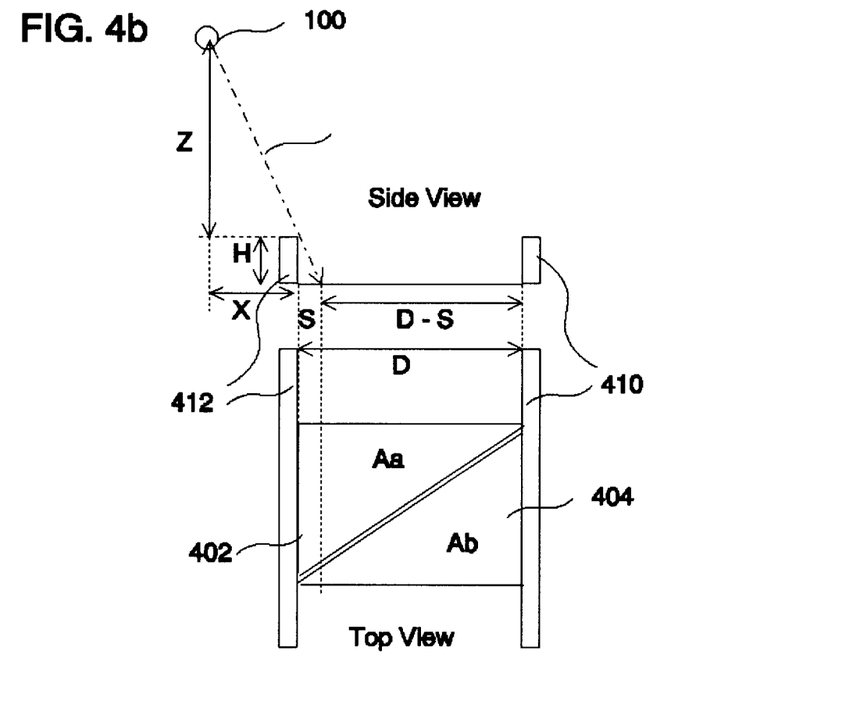

FIG. 4a shows the side view and the top view of a location tracking device that contains two triangular planar light sensors 402, 404, and two walls 410, 412. The distance between those two walls is D, and the height of the wall is H. The distance from the edge of the wall 410 to the light source 100 along horizontal direction is defined as X. The vertical distance from top of the wall 410 to the light source 100 is defined as Z. The sizes D and H of the device are exaggerated in FIGS. 4(a,b). In reality, D is much smaller than X, and h is much smaller than Z. From the geometry shown in FIG. 4a, we have $$X=[(Iax-Ibx)/(Iax+Ibx)]*(D/H)*Z=Rx*(D/H)*Z \tag{7}$$

where Iax is the photo current detected by the top sensor 402, Ibx is the current detected by the bottom sensor 404, and Rx=(Iax−Ibx)/(Iax+Ibx). In the following sections, the location tracking device in FIG. 4a is called "dual wall" device. When the light source is moved to the other side of the wall 412 as illustrated by FIG. 4b, the dual wall device still follows Eq. (7), and the sign of Rx represents the sign of X dimension correctly. The viewing angle of dual wall device is therefore twice wider than that of center wall device. Valid viewing angle of the device is limited by the ratio (H/D).

Figure 5:
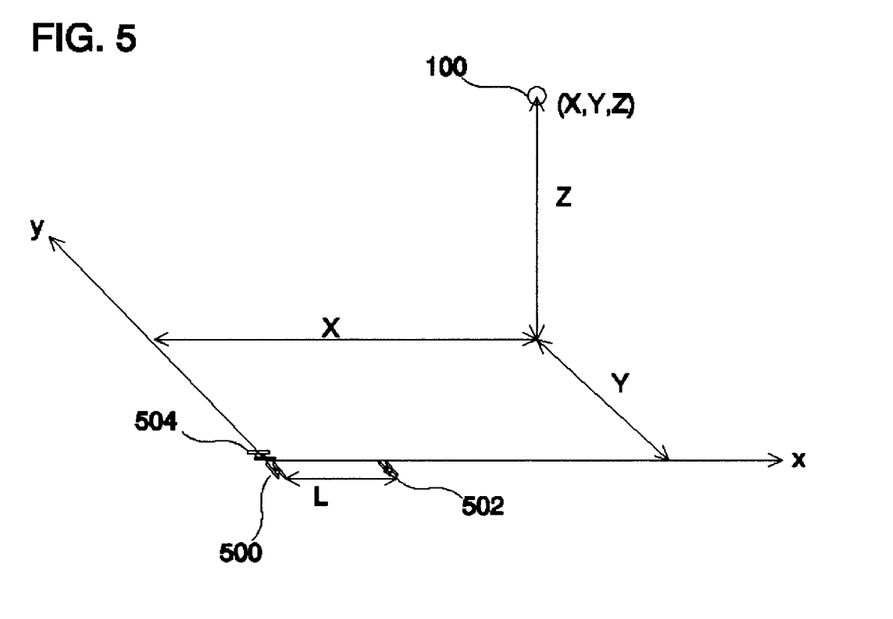
FIG. 5 illustrates the method to determine three dimensional location of a light source using dual wall location tracking devices.

FIG. 5 shows a method to determine three-dimensional location of a light source using three dual wall devices. The walls of two dual wall devices 500, 502 are separated by a distance L with their walls facing x direction, and the third dual wall device 504 has its walls facing the y axis as shown in FIG. 5. Define the distance to the light source 100 along the x axis as X for the first device 500, and the distance is X' for the second device 502. From Eq. (7) we have $$\begin{aligned} X - X' &= L \\ &= [(Iax - Ibx)/Iax + Ibx) - (Iax' - Ibx')/Iax' + Ibx')])*(D/H)*Z \\ &= (Rx - Rx')*(D/H)*Z \end{aligned} \quad (8)$$

where Iax and Ibx are photo currents measured by triangular sensors in the first device 500, Iax' and Ibx' are photo currents measured by triangular sensors in the second device 502, Rx=(Iax−Ibx)/Iax+Ibx). and Rx'=(Iax'−Ibx')/Iax'+Ibx'). From Eq. (8) we have $$Z = L*H/D/(Rx-Rx') \quad (9)$$

$$X = Rx*(D/H)*Z = [Rx/(Rx-Rx')]*L \quad (10)$$

The dimension Y can be determined by the third device 504 as $$Y = Ry*(D/H)*Z = [Ry/(Rx-Rx')]*L \quad (11)$$

where Ry=(Iay−Iby)/Iay+Iby) while Iay and Iby are photo currents detected by the photo sensors in the third device 504.

The above discussion shows that data analysis of the dual wall device can be done by the same simple mathematical equation, Eqs. (9–11), in all four quadrants of the coordinate.

The dual wall devices provide wider viewing angle. It simplifies the data analysis procedure significantly, it is reliable and ready for mass production. However, it still encounters the same problem that its supporting signal processing system is too slow and too expensive. It still needs analog diver, AGC, and filters to translate photo currents into locations from Eqs. (9–11). Novel analog signal processing circuits of this invention are therefore developed to support the above location tracking devices as set forth in the following sections.

Figure 6A:
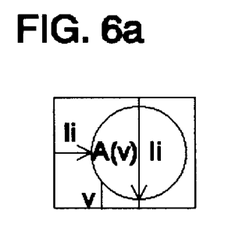
Figure 6B:
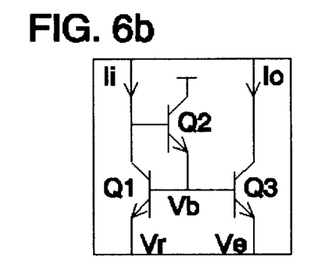

The major building blocks for the circuits of this invention are voltage controlled current amplifiers (VCCA) and current mirrors. To simplify discussions in the following sections, those building blocks are symbolized as shown in FIGS. 6(a–h). FIG. 6a shows the symbol for a VCCA. The output current of a VCCA is $A(v)*Ii$ where Ii is the input current. A(v) is the amplification factor that is a function of the input voltage v. FIG. 6b. shows an example of an embodiment of a VCCA using bipolar transistors. Transistors Q1 and Q3 are matched transistors, and they have identical base voltage. Using the well known relationship of bipolar transistors, we have $$\begin{aligned} A(v) &= Io/Ii = \exp[K(Vb - Ve)]/\exp[K(Vb - Vr)] = \exp[K(Ve - Vr)] \quad (12) \\ &= \exp(Kv) \end{aligned}$$

where K is a constant independent of the input current, Vb is the base voltage of Q1 and Q3, Vr is the emitter voltage of Q1, Ve is the emitter voltage of Q3, Ii is the input current, and Io is the output current Transistor Q2 in FIG. 6b is used to reduce the effect of base currents as well known to the art While specific embodiments of the invention have been illustrated and described herein, it is realized that other modifications and changes will occur to those skilled in the art. For example, the amplification factor A(v) does not need to follow Eq. (12). The amplification factor can be any function of the input voltage while the present invention will still function correctly. It should be obvious to those skilled in the art that the VCCA also can be realized using MOS devices instead of bipolar devices. We also can replace the voltage controlled current amplifier with a voltage controlled gain amplifier so that the inputs are voltages instead of currents.

Figure 6C:
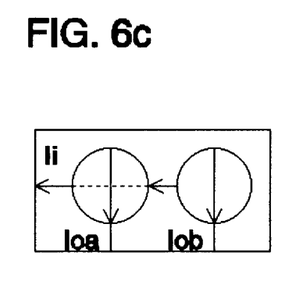
Figure 6D:
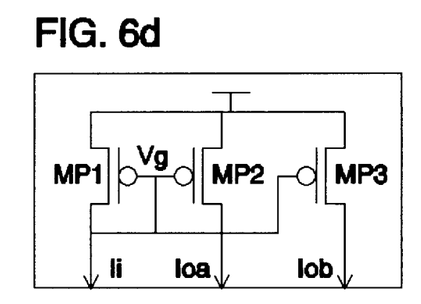
Figure 6E:
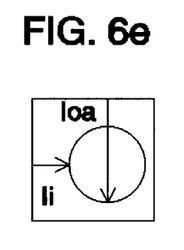
Figure 6F:
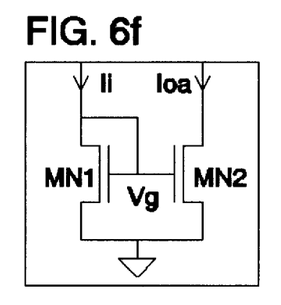

FIG. 6c shows the symbol of a p-channel current mirror. FIG. 6d shows and example of an embodiment of the current mirror implemented by p-channel MOS transistors. Transistors MP1, MP2, MP3 are matched transistors, and they have the same gate to source voltage. Therefore, the output currents Ioa and Iob are identical to the input current Ii. FIG. 6e shows the symbol of an n-channel current mirror. FIG. 6f shows and example of an embodiment of the current mirror implemented by n-channel MOS transistors. Transistors MN1 and MN2 are matched transistors, and they have the same gate to source voltage. Therefore, the output currents Ioa is identical to the input current Ii. Current mirrors are well known to the art of circuit design. The embodiment shown in FIGS. 6(d,f) can be replaced by hundreds of other types of current mirrors. There is no need to provide further details about current mirrors.

Figure 6G:
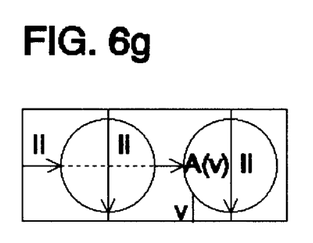
Figure 6H:
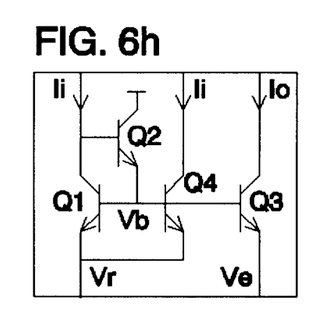

FIG. 6g shows the symbol of a VCCA and a current mirror sharing the same input, and FIG. 6h shows one example of its embodiment. Transistors Q1, Q3, and Q4 in FIG. 6h are matched transistors. Q1 and Q4 have the same base to emitter voltage, so that the output current is equal to the input current Ii. Q1 and Q3 forms an VCCA as discussed in previous sections. This device is called VCCAM in the following sections.

Figure 7:
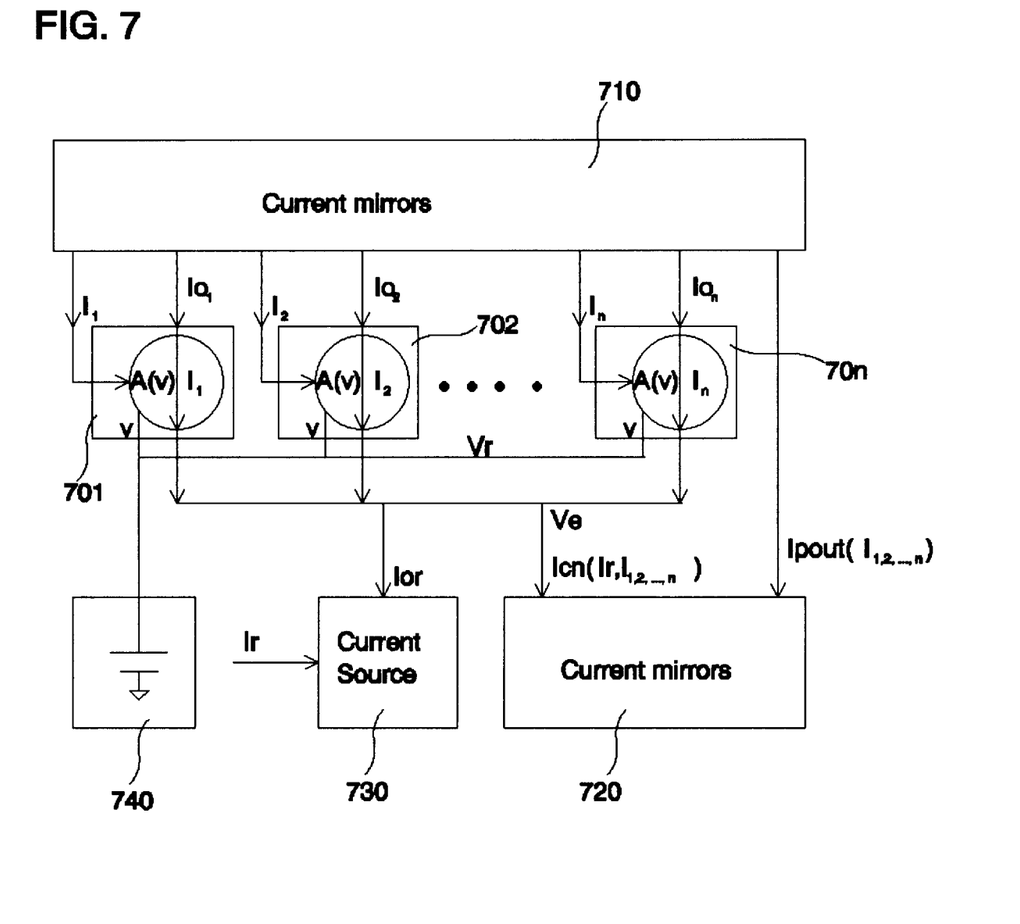
FIG. 7 is a general symbolic block diagram of the present invention.

Using the building blocks shown in FIGS. 6(a–h), we are ready to construct analog signal processing circuits of the present invention. FIG. 7 shows a general symbolic diagram of the analog signal analyzer of this invention. The signal analyzer comprises a plurality of voltage controlled current amplifiers 701, 702, . . . , 70n as shown in FIG. 7. The voltage inputs Vr, Ve of those VCCA's are all connected together so that they have identical amplification factor A(v). The input voltage Vr is connected to a bias circuit, that is shown as a voltage source 740 in FIG. 7. In reality, the bias circuit 740 does not need to be a voltage source. A current source 730 generates a reference current Ior using reference current Ir. The output of the current source is connected to Ve. The input currents I1, I2, . . . , In, and the output currents Io1, Io2, . . . , Ion of those VCCA's are processed by a group of p-channel current mirrors 710. The outputs of those p-channel current mirrors 710 are sent to a group of n-channel current mirrors 720 to generate a bias current Icn. Icn is a function of input currents. The outputs of those n-channel current mirrors 720 are connected to Ve. The summation of all output currents Io1, Io2, . . . , Ion must be equal to Ior+Icn, so that $$Io1 + Io2 + \ldots + Ion = A(v)*[I1 + I2 + \ldots + In] = Ior + Icn. \quad (13)$$

Eq. (13) shows that the amplification factor A(v) can be adjusted by bias currents Ior and Icn. This relationship provides a powerful and flexible way to execute analog signal processing as demonstrated by examples in the following sections.

Figure 8A:
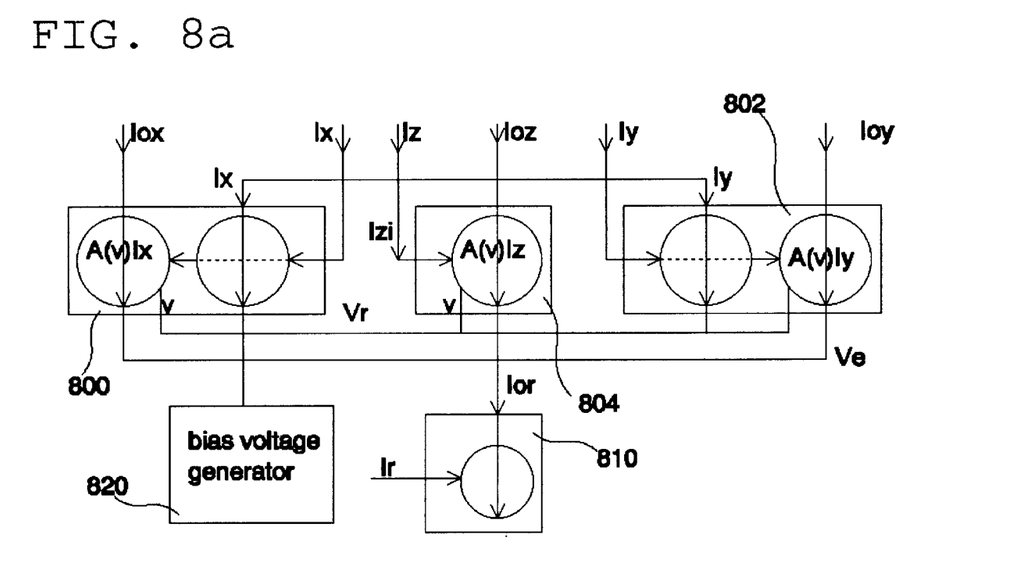
FIG. 8a is a symbolic circuit diagram of an analog signal processing circuit supporting the location tracking device in FIG. 1.
Figure 8B:
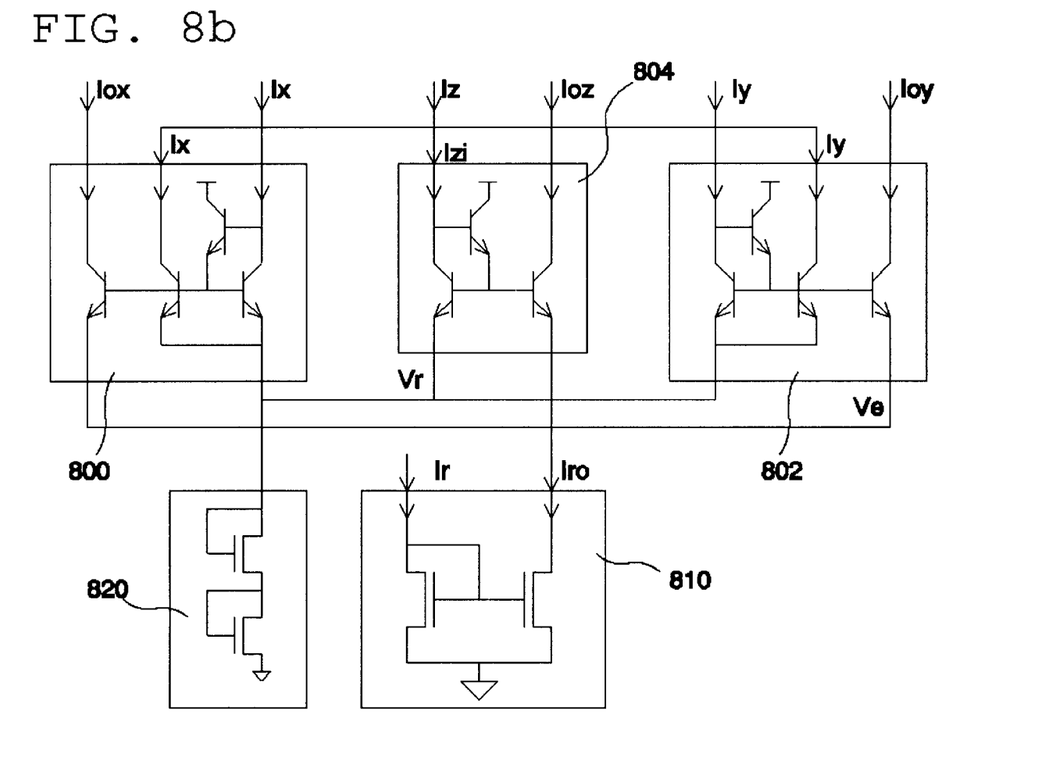

FIG. 8a is a symbolic circuit diagram of a signal analyzer to support the location tracking device in FIG. 1. The input of a VCCAM 800 is connected to the output of the x sensor 104x in FIG. 1. The photo current detected by the x sensor 104x is Ix. The input of another VCCAM 802 is connected to the output of the y sensor 104y in FIG. 1 (photo current Iy). The outputs of the current mirrors in those two VCCAM's 800, 802 are connected to the output of the z sensor 104z in FIG. 1. The output of the z sensor 104z is also connected to the input of a VCCA 804. We have Izi=(Iz−Ix−Iy) where Iz is the photo current detected by the z sensor 104z, and Izi is the input current to the VCCA 804. The outputs of the VCCA and two VCCAM's are connected together as node Ve, then connected to a reference current source 810. The output current Ior of the current source 810 is equal to the reference current Ir. The other control voltage Vr is connected to a bias circuit 820. For simplicity, we will not show the bias circuit in the following circuit diagrams. FIG. 8b is the schematic circuit diagram of a realistic circuit implementation of the symbolic circuit in FIG. 8a. Since Iox+Ioy+Ioz=Ir=A(v)*(Ix+Iy+Izi), we have $$A(v)=Ir/[Ix+Iy+Izi]=Ir/Iz \qquad (14)$$

$$Iox=A(v)*Ix=(Ix/Iz)*Ir \qquad (15)$$

$$Ioy=A(v)*Iy=(Iy/Iz)*Ir \qquad (16).$$

Using Eqs. (2,3,15,16), the two dimensional location [X,Y] of the light source 100 is represented by the output currents Iox, Ioy of the circuit in FIG. 8 as $$[X,Y]=[(Iox/Ir)*Z, (Ioy/Ir)*Z] \qquad (17).$$

Figure 9A:
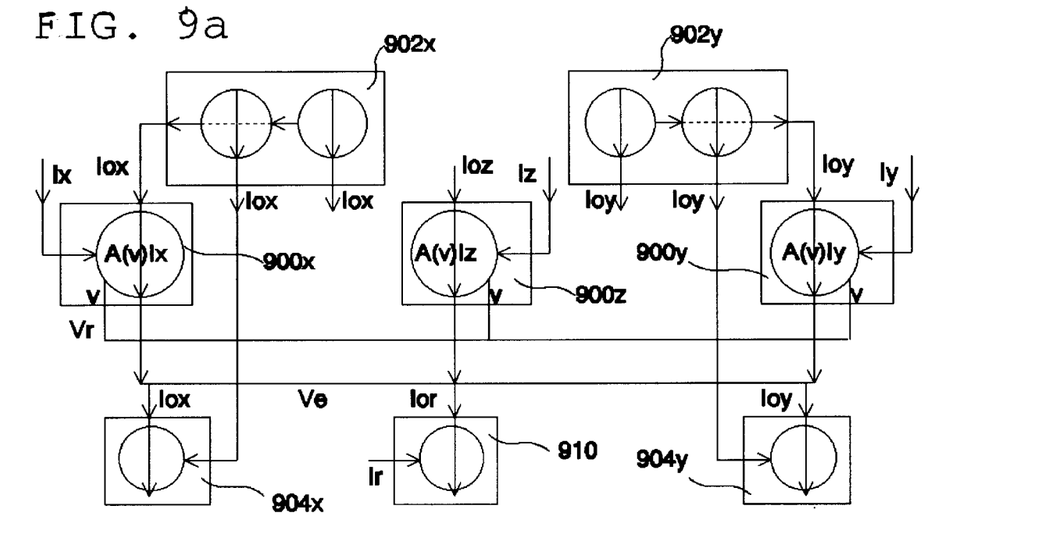
FIG. 9a is a symbolic circuit diagram of another analog signal processing circuit supporting the location tracking device in FIG. 1.
Figure 9B:
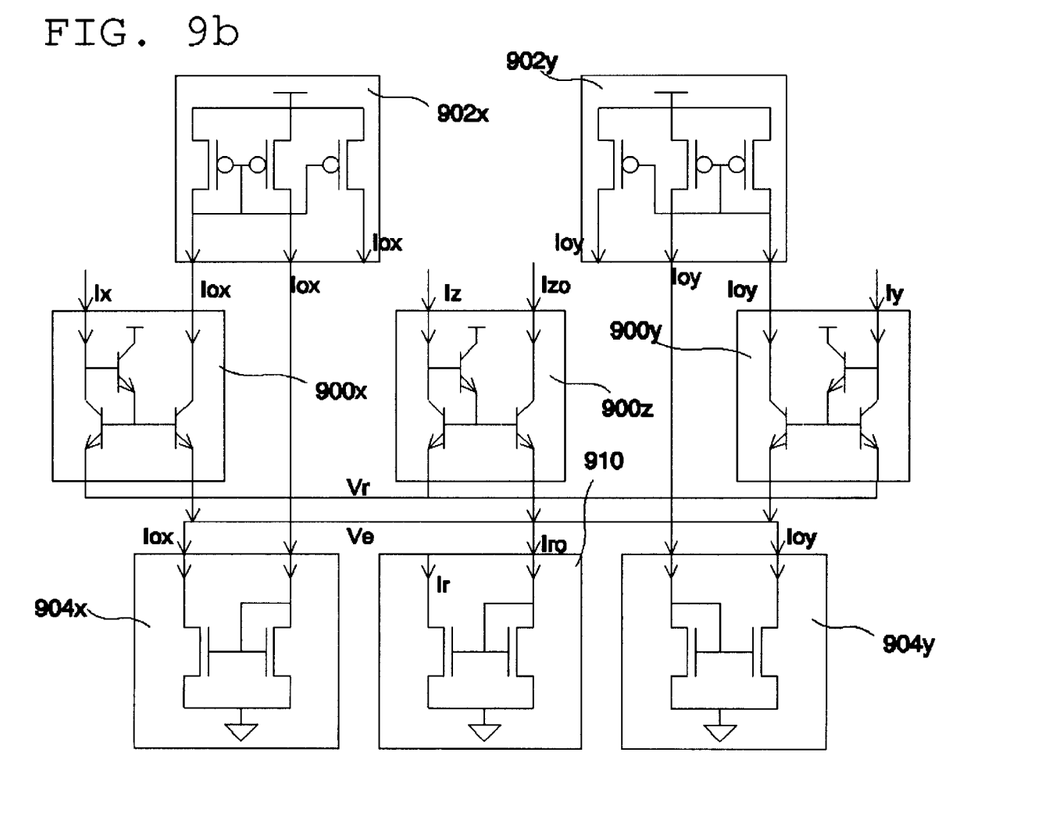

The circuit in FIGS. 8(a,b) requires that Iz>(Ix+Iy). Otherwise the circuit will not function correctly. A modified design shown in FIGS. 9(a,b) removes the limitation. The photo currents Ix, Iy, Iz are sent to the inputs of three VCCA's 900x, 900y, 900z. The output currents Iox and Ioy are duplicated by p-channel current mirrors 902x, 902y and n-channel current mirrors 904x, 904y. The node Ve of all VCCA's are connected together. Ve is also connected to the outputs of the n-channel current mirrors 904x, 904y, and the output of a reference current source 910. FIG. 9b shows the schematic diagram of a realistic implementation of symbolic circuit in FIG. 9a. The node Vr of all VCCA's are also connected together to a bias circuit (not shown). Using the relation that the total currents flowing into node Ve must be zero, we have $$A(v)=Ioz/Iz=Ir/Iz \qquad (18)$$

$$Iox=A(v)Ix=(Ix/Iz)*Ir \qquad (19)$$

$$Ioy=A(v)Iy=(Iy/Iz)*Ir \qquad (20).$$

Eqs. (19,20) are identical to Eqs. (15,16). It should be obvious that we also can determine the location [X,Y] of the light source 100 by Eq. (17) from the output currents of the circuit in FIG. 9a. The major advantage of the circuit in FIG. 9a is that it is no longer limited by the condition Iz>Ix+Iy. However, this circuit can be slightly slower than the circuit in FIG. 8a.

The single stage circuits in FIGS. (8,9) fulfills all the functions supported by the complex instrument in FIG. 2. Using single stage circuits, we are able to execute two analog divisions of input currents (Ix/Iz) and (Iy/Iz) simultaneously. The function of pre-amplifiers and Automatic Gain Control (AGC) amplifiers are served by the fact that the full scale current is always equal to Ir for all the output currents Iox, Ioy. The amplitudes of input currents Ix, Iy, Iz can change by orders of magnitudes while the outputs are only dependent on current ratios instead of their amplitude. The circuit also can serve the function of filters by modulating the reference current Ir with the frequency of the light emitted from the light source. On the other word, the present invention in FIGS. (8,9) is able to replace all the expensive instruments in FIG. 2. This circuit is very fast, our results show that it can operate at GHZ bandwidth. Its accuracy is by far better than the complex system in FIG. 2.

The analog signal analyzers of the present invention have been developed to support optical location tracking devices, but they certainly can support many other applications. For example, the above circuits can execute analog division or analog multiplication of a plurality of inputs simultaneously. The high speed AGC and the filtering function also can be applied to a wide variety of applications. The present invention is also extremely flexible. By properly define the relationship between A(v) and inputs, the present invention is capable of executing complex analog calculation that used to require an analog computer of prior art The circuits in FIGS. (8,9) are simple examples that of this invention. The following examples demonstrate the flexibility of the present invention to support more complex calculations.

Figure 10A:
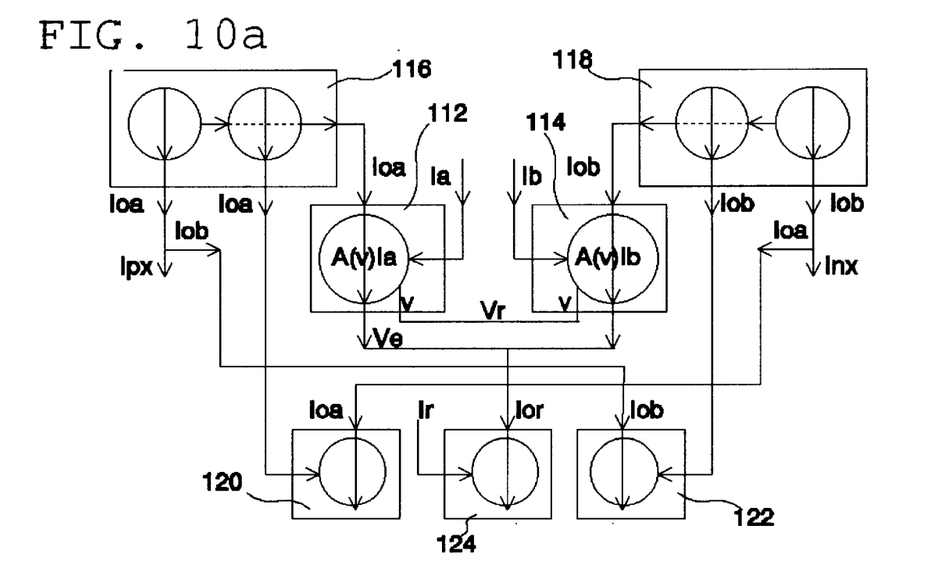
Figure 10B:
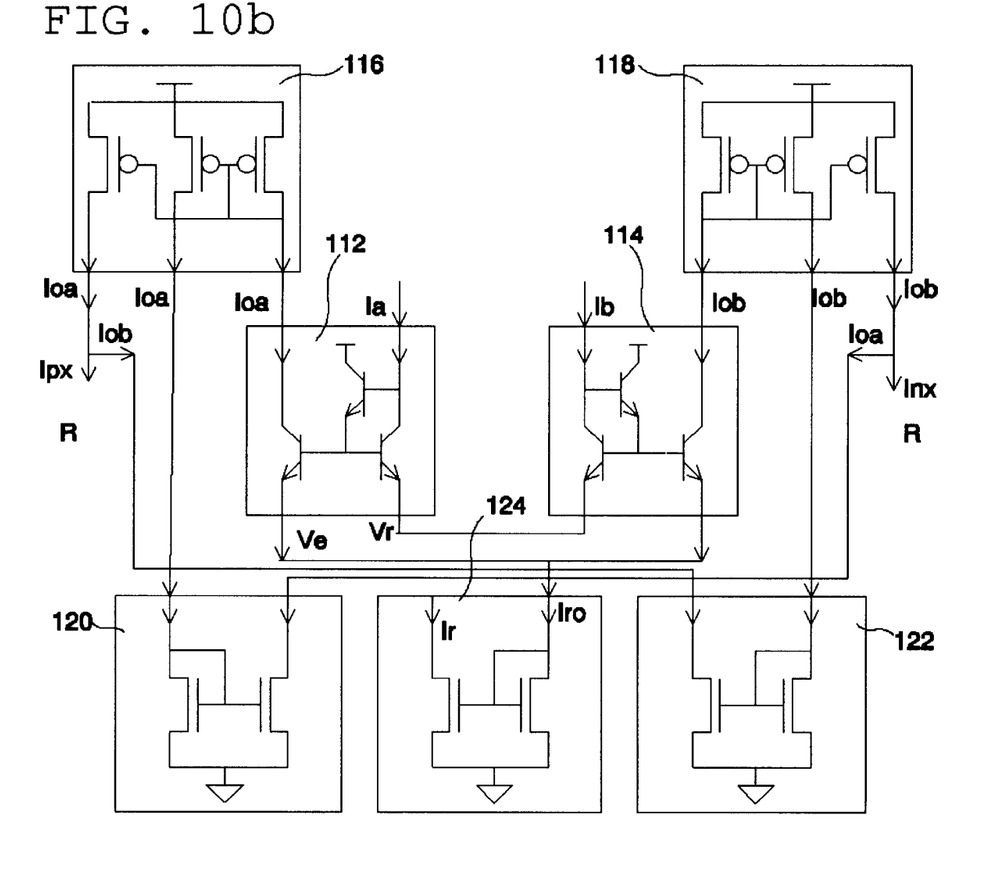

FIG. 10a is the symbolic circuit diagram of an analog signal analyzer for the dual wall location tracking devices in FIG. 4. FIG. 10b is the schematic diagram of a realistic embodiment of the circuit in FIG. 10a. The photo currents Ia, Ib of the triangle sensors 402, 404 are inputs to two VCCA's 112,114. The Vr nodes of VCCA's are connected to a bias circuit (not shown). The Ve nodes are connected to the output of the reference current source 124. The output currents Ioa, Iob of those two VCCA's are duplicated by p-channel current mirrors 116 118, and n-channel current mirrors 120, 122. The output of the n-channel current mirror on the left 120 is connected to one output of the p-channel current mirror on the right 118. The output of the n-channel current mirror on the right 122 is connected to one output of the p-channel current mirror on the left 116. In this configuration, A(v)=Ir/(Ia+Ib). When Ia>Ib, the output currents Ipx is $$Ipx=Ioa-Iob=A(v)*(Ia-Ib)=[(Ia-Ib)/(Ia+Ib)]*Ir \qquad (21)$$

while the other output current Inx is zero. When Ia<Ib, the output current Inx is $$Inx=Iob-Ioa=[(Ib-Ia)/(Ib+Ia)]*Ir \qquad (22)$$

while the other output current Ipx is zero. From Eqs. (7,21,22) we have $$X=(Ipx-Inx)/Ir*(D/H)*Z \qquad (23)$$

$$Rx=(Ipx-Inx)/Ir \qquad (24)$$

where Rx=(Iax−Ibx)/(Iax+Ibx). Eq. (23) shows that the location X, including the sign of X, can be calculated from the output currents of the circuit in FIG. 10. Similar equations also can be used for Y and X'.

Figure 11:
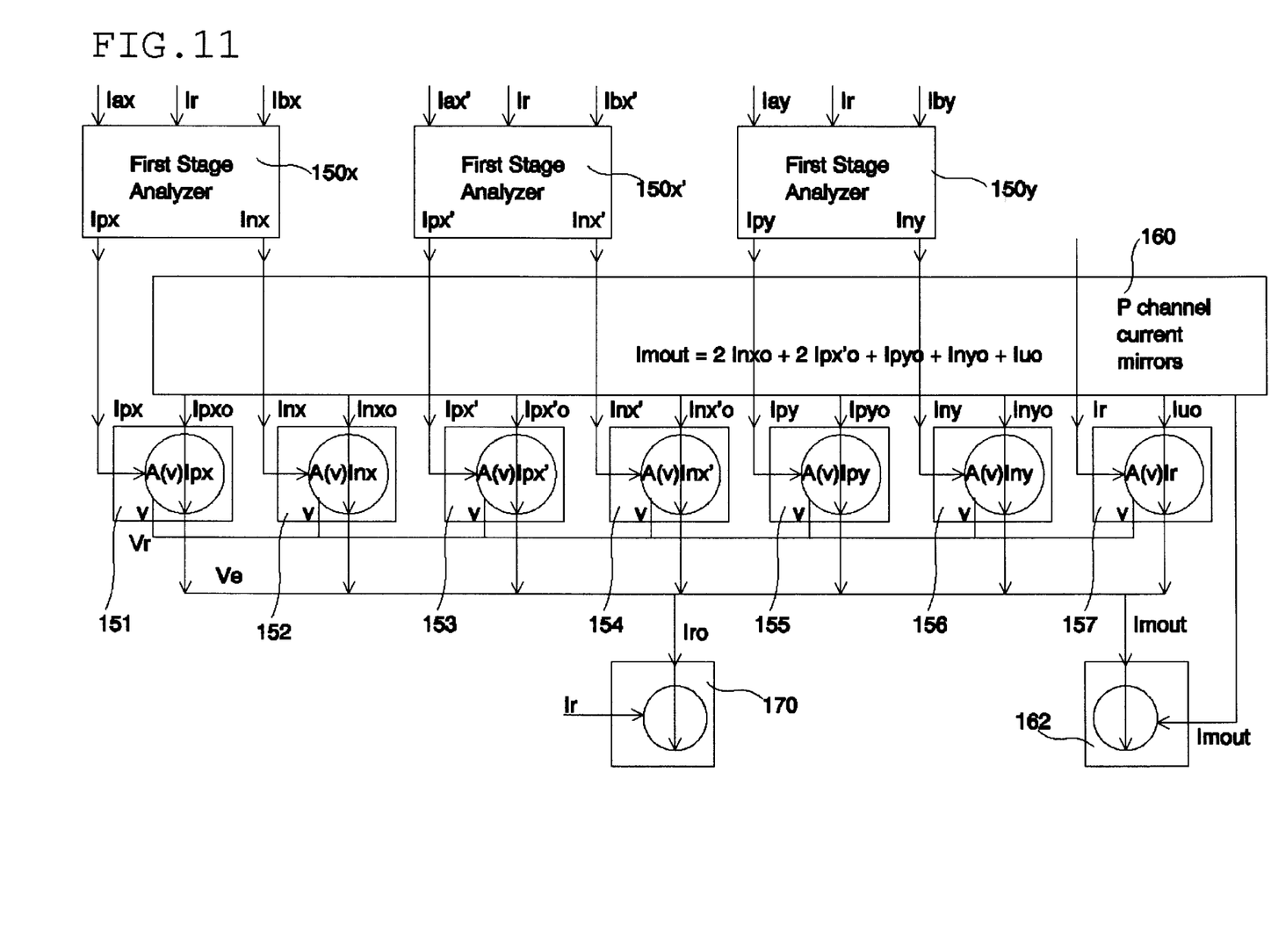
FIG. 11 is a symbolic circuit diagram of an analog signal analyzer supporting three dimensional location tracking of dual wall devices.

Now we are ready to determine the three dimensional location of the light source [X,Y,Z] using dual wall devices shown in FIG. 5. FIG. 11 is the symbolic circuit diagram of an analog signal analyzer to support the location tracking device in FIG. 5. The photo currents Iax, Ibx detected by the light sensors of the first dual wall device 500 in FIG. 5 are sent to a first stage analyzer 150x shown in FIG. 10. The photo currents Iax', Ibx' detected by the light sensors of the second dual wall device 502 are sent to another first stage analyzer 150x'. The photo currents Iay, Iby detected by the light sensors of the third dual wall device 504 are sent to another first stage analyzer 150y. The output currents Ipx, Inx, Ipx', Inx', Ipy, Iny of those three first stage analyzers are sent to 6 VCCA's 151–156 as shown in FIG. 11. The reference current used by those three first stage analyzer is also sent to a VCCA 157. The Vr nodes of all 7 VCCA's are connected to a bias voltage generator (not shown). The Ve nodes of all 7 VCCA's are connected together. The output currents of those VCCA's Ipxo, Inxo, Ipx'o, Inx'o, Ipyo, Inyo, Iuo are sent to a group of p-channel current mirrors 160. Those p-channel current mirrors 160 generate a current Imout=2*Inxo+2*Ipx'0+Ipyo+Inyo+Iuo. An n-channel current mirror 162 duplicates Imout, and sinks the current from Ve node. Ve node is also connected to a reference current source 170. Balancing the total current at node Ve, we have $$\begin{aligned}
Ir &= Ipxo + Inxo + Ipx'o + Inx'o + Ipyo + Inyo + Iuo - Imout \quad (25)\\
&= Ipxo - Inxo - Ipx'o + Inx'o \\
&= A(v)[(Ipx - Inx) - (Ipx' - Inx')] \\
&= (Rx - Rx') * Ir * A(v).
\end{aligned}$$

From Eqs. (9,10,11,23,24,25) we have $$A(v) = Iuo/Ir = 1/(Rx - Rx') \quad (26)$$

$$Z = (Iuo/Ir) * L * H/D \quad (27)$$

$$X = [(Ipxo - Inxo)/Ir] * L \quad (28)$$

$$Y = [(Ipyo - Inyo)/Ir] * L \quad (29)$$

where L, H, D are parameters defined in FIG. 5. Eqs. (27–29) show that signed three dimensional location [X,Y,Z] of a light source can be calculated by the two-stage circuit shown in FIG. 11.

As apparent from the foregoing examples, the present invention is extremely flexible in supporting analog signal processing of different calculations. Using single stage circuits, the present invention can execute analog calculation such as $$\begin{aligned}
Ioj &= (A_1I_1 + A_2I_2 + \ldots + A_jI_j + \ldots)/(B_1I_1 + B_2I_2 + \ldots + B_jI_j + \ldots) \quad (30)\\
&= MUL(I_1, I_2, \ldots, I_j, \ldots)/DEN(I_1, I_2, \ldots, I_j, \ldots)
\end{aligned}$$

where Ioj is one of the output current, $I_1, I_2, \ldots, I_j$, are input currents of VCCA's, $A_1, A_2, \ldots, A_j$ are weighing parameters for the multiplication factor Mul, and $B_1, B_2, \ldots, B_j$ are weighing parameters for the denominator DEN of the calculation. Those weighing parameters can be positive or negative numbers, and they do not need to be integers.

The procedures to configure the present invention for the above general calculation are:

(1) Connect input signals $I_1, I_2, \ldots, I_j$ to VCCA's. The input signals may need to be modified as shown in the example in FIGS. 8(a,b). Although the foregoing examples use photo currents as input signals, other types of input signals such as voltage (replace VCCA with voltage controlled transconductance amplifier VCTA), currents . . . are also supported.

(2) Connect the nodes, Ve and Vr, that define the gains of those VCCA's (or VCTA's) so that all VCCA's have the same amplification factor A(v). Provide a bias circuit to the node Vr.

(3) Define the denominator DEN of the desired "divide" operation by controlling the amplification factor A(v). It should be obvious from previous examples in FIGS.

(9–11) that the denominator can be defined by providing proper bias currents to node Ve of VCCA's. For the example in FIG. 11, we wanted to substrate Ipx' from the denominator, so we use current mirrors to sink a current 2*Iopx' from node Ve. For the example in FIG. 9a, we wanted to have a denominator independent of an input current Iy, so we use current mirrors to sink a current Ioy from node Ve. For the example in FIG. 10a we wanted to add Ia to the denominator, that is done by simply not sinking any current related to Ia from node Ve.

In general, if we want to subtract a factor k*Ij to the denominator of the desired divide operation, we should sink a current (k+1)*Ioj from node Ve, where Ij is any one of the input currents to VCCA's, Ioj is the output current of the VCCA that has input current Ij, and k is defined by the ratio of current mirrors, which can be any value.

(4) Connect Ve node to a reference current source so that all the output currents are normalized to the reference current. This normalization procedure provides the automatic gain control function because all the outputs are automatically controlled to have their full scale value equal to the reference current. The reference current also serves as the "unit current" for next stage of calculations.

(5) Use current mirrors to define the multiplication factor MUL. This procedure is well known in the current art. There is no need for further discussion.

The above procedures allow a user to execute analog calculations with the general format in Eq. (30) using single stage circuits. Many such calculations can be executed simultaneously as shown by the examples in previous sections. The present invention therefore provides an unprecedented calculation power for analog signal analyzing circuits.

The above procedures show a strong regularity that is ideal for computer automatic design. The electrical components used by this invention also shows a strong regularity that is ideal for systematic integrated circuit design. It is therefore very convenient to design analog signal processing hardware using the concept of application specific integrated circuits (ASIC) or programmable logic that is currently only applicable to logic circuits. Repeating units of VCCA's and current mirrors are manufactured in a general integrated circuit without metal connections. For each specific application, the users input the needed analog calculations for a software to define the metal connections between those components using the above analytical procedures. The final function of the programmable analog circuit is defined by the bias currents that determines the amplification factor A(v). The cost in designing new analog signal analyzer is reduced significantly because we only need to change the metal layers of the IC for each new product. Similarly, the connections can be defined by programmable multiplexers. It is therefore very convenient to design programmable analog signal processing integrated circuits using the present invention.

As apparent from the foregoing, following advantages may be obtained according to this invention.

(1) The present invention uses a few transistors to replace complete prior art systems including pre-amplifiers, filters, AGC, analog dividers, . . . etc.

(2) This invention accepts input signals having a wide range of amplitudes.

(3) As demonstrated by the examples in previous sections, this invention can support a wide variety of applications by simple modifications in its configuration. For those skilled in the art, it is possible to perform very complex calculations with a few stages of circuits. This invention is so flexible that its applications are only limited by the imagination of the users.

(4) The present invention easily achieved GHZ bandwidth using existing manufacture technology.

(5) This invention is able to execute multiple calculations simultaneously. Combining this parallel processing capability with high bandwidth operation, we are able to achieve unprecedented performance for analog signal processing systems.

(6) This invention is ready to be manufactured by existing IC technology. The circuit components used by this invention is ideal for IC design because of their regularity. It is possible to use the concept of Application Specific Integrated Circuits (ASIC) to layout repeating circuit elements of the present invention, then "program" the connections of those circuit elements to support different applications. On the other word, it is possible to build "analog ASIC" or "programmable analog signal processor" of this invention.

(7) This invention does not use any operational amplifier or any other complex feedback mechanism. The circuit is stable and reliable.

The present invention has been described with reference to particular examples to support optical location tracking devices. It is to be understood that variations and modifications can be made within the spirit and scope of the invention by those skilled in the. Such changes and modifications are to be understood as included within the scope of the present invention as defined by the appended claims.

What is claimed is:

1. An analog signal processing circuit comprising:
   a plurality of input means for receiving a plurality of input signals S(i) therein, where i=1,2,3, ... N and N is a positive integer;
   a plurality of voltage controlled signal amplifiers VCSA (i) where i=1,2,3, ... N, and each being connected to a corresponding input means for generating a plurality of VCSA output currents I'(i) where I'(i)=A(i) S(i) and A(i) being an amplification factor of said VCSA(i);
   each of said VCSA(i) includes a VCSA input voltage means connected to a common VCSA input for providing a common amplification factor of A(VCSA)=A (i) where i=1,2,3, ... N;
   an amplitude control unit connected to all of said VCSA output current I'(i) for generating an amplitude control current I(ref) whereby $\Sigma I'(i)=A(VCSA) \Sigma S(i)=I(ref)$ wherein $\Sigma$ representing a sum over i=1,2,3, ... N, whereby said amplification factor A(VCSA) can be adjusted by said amplitude control current I(ref).

2. The circuit as recited in claim 1 wherein:
   said input means further includes an input signal processing means to receive a plurality of signals to generate said input signals S(i).

3. The circuit as recited in claim 1 further comprising:
   a signal sink connected to all of said VCSA output current I'(i) for generating a bias current I(bias) whereby $\Sigma I'(i)=A(VCSA)\Sigma S(i) =I(ref)+I(bias)$.

4. An analog signal processing circuit comprising:
   a plurality of input means for receiving a plurality of input currents I(i) therein, where i=1,2,3, ... N, and N is a positive integer;
   a plurality of input voltage controlled current amplifier VCCA(i) where i=1,2,3, ... N, and each being connected to a corresponding input means for generating a plurality of VCCA output current I'(i) where I'(i)=A(i) I(i) and A(i) being an amplification factor of said VCCA(i);
   each of said VCCA(i) includes a VCCA input voltage means connected to a common VCCA input for providing a common amplification factor of A(VCCA)=A (i) where i=1,2,3, ... N;
   an amplitude control unit connected to all of said VCCA output currents I'(i) for generating an amplitude control current I(ref) whereby $\Sigma I'(i)=A(VCCA) \Sigma I(i)=I(ref)$ wherein $\Sigma$ representing a sum over i=1,2,3, ... N, whereby said amplification factor A(VCCA) can be adjusted by said amplitude control current I(ref).

5. The circuit as recited in claim 4 wherein:
   said input means further includes an input current processing means to receive a plurality of currents to generate said input currents I(i).

6. The circuit as recited in claim 4 further comprising:
   a post-output current processing means includes a plurality of current mirrors connected said output currents of said voltage control current amplifiers.

7. The circuit as recited in claim 4 further comprising:
   a current sink connected to all of said VCCA output currents I'(i) for generating a bias current I(bias) whereby $\Sigma I'(i)=A(VCCA) \Sigma I(i)=I(ref)+I(bias)$.

8. The circuit as recited in claim 5 wherein:
   said input current processing means includes a plurality of current mirrors.

9. An analog signal processing circuit comprising:
   a plurality of input means for receiving a plurality of input currents I(i) therein, where i=1,2,3, ... N and N is a positive integer;
   a plurality of input voltage controlled amplifier VCCA(i) where i=1,2,3, ... N, and each being connected to a corresponding input means for generating a plurality of VCCA output current I'(i) with I'(i)=A(i)I(i) and A(i) being an amplification factor of said VCCA(i);
   each of said VCCA(i) includes a VCCA input voltage means connected to a common VCCA input voltage for providing a common amplification factor of A(VCCA) =A(i) where i=1,2,3, ... N;
   an amplitude control unit and a current sink connected to all of said VCCA output currents I'(i) for generating respectively an amplitude control current I(ref) and a bias current I(bias) whereby $\Sigma I'(i)=A(VCCA) \Sigma I(i)=I (ref)+I(bias)$ wherein $\Sigma$ representing a sum over i=1,2, 3, ... N; and
   a plurality of current mirror means connected to said current sink for controlling said bias current I(bias) whereby said amplification factor A(VCCA) is adjusted by said amplitude control current I(ref) and said bias current I(bias).

10. The circuit as recited in claim 4 wherein:
    each of said VCCA(i) includes two matched first and second bipolar transistors wherein a base of each of said transistors being connected together, and an emitter of each of said transistor being connected to a first and a second voltages for defining said input voltage for controlling said amplification factor A(i) with a collector of said first bipolar transistor receiving said input current I(i) and a collector of said second transistor providing said output current.

11. A method for performing an analog signal process comprising:

connecting each of a plurality of input currents I(i) to a corresponding input voltage controlled amplifier VCCA(i), where i=1,2,3, . . . N and N being a positive integer, for generating a plurality of VCCA output current I'(i) where I'(i)=A(i) I(i) and A(i) being an amplification factor of said VCCA(i);

connecting each of said VCCA(i) to a common VCCA input voltage for providing a common amplification factor of A(VCCA)=A(i) where i=1,2,3, . . . N;

connect all of said VCCA currents I'(i) to an amplitude control unit and a current sink for generating respectively an amplitude control current I(ref) and a bias current I(bias) whereby ΣI'(i)=A(VCCA) ΣI(i)=I(ref)+ I(bias) wherein Σ representing a sum over i=1,2,3, . . . N, whereby said amplification factor A(VCCA) can be adjusted by said amplitude control current I(ref) and said bias current I(bias).

\* \* \* \* \*